Sept. 28, 1926.
J. M. CALKINS
1,600,975
TOOTHBRUSH
Original Filed Jan. 2, 1926
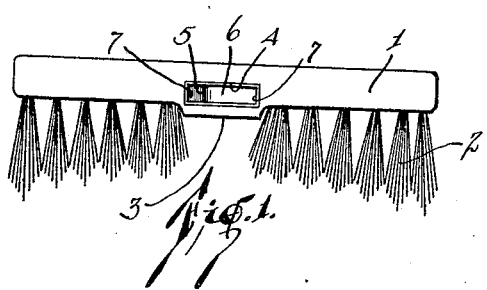
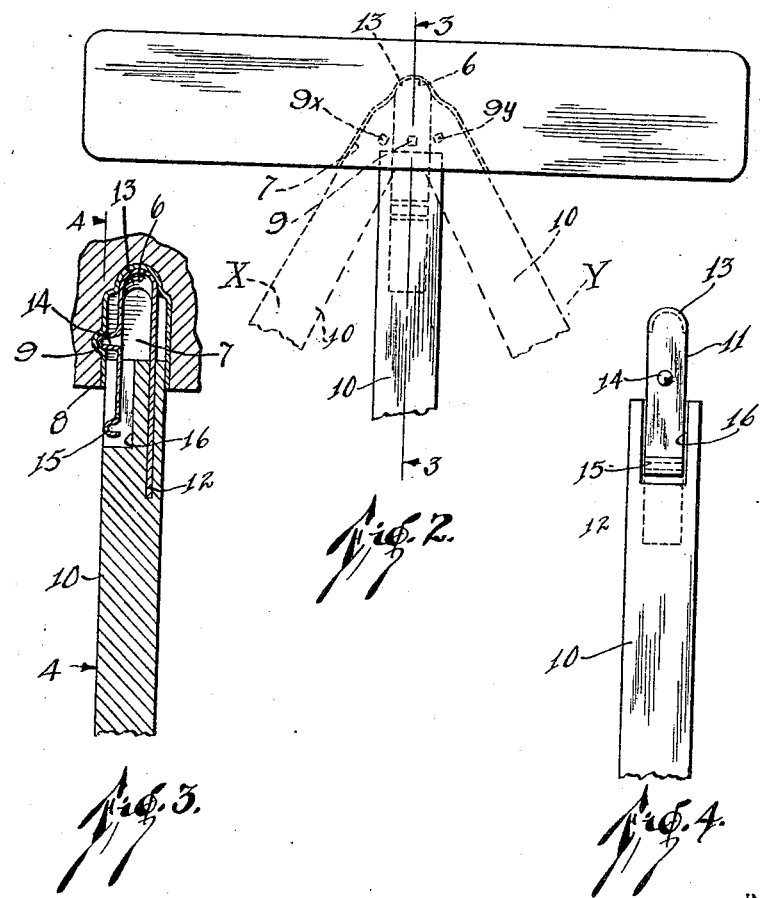
INVENTOR
J.M. Calkins
BY
ATTORNEYS Patented Sept. 28, 1926.

1,600,975

UNITED STATES PATENT OFFICE.

JAMES M. CALKINS, OF DETROIT, MICHIGAN.

TOOTHBRUSH.

Original application filed January 2, 1926, Serial No. 79,008. Divided and this application filed May 3, 1926. Serial No. 106,505.

My invention relates to improvements in tooth brushes, and it consists in the combinations, constructions, and arrangements herein described and claimed.

This application is a division of my co-pending application, Serial No. 79,008, filed January 2, 1926.

An object of my invention is to provide a brush having relatively soft bristles and a removable handle, this handle being attachable to the brush in various positions to permit the brush to be readily inserted in the mouth and give a movement parallel with the crevices of the teeth, regardless of what portions of the two rows of teeth are being cleaned.

A further object of my invention is to provide a device of the type described in which the fastening end of the handle is concealed within the back of the brush, there being no projections which would endanger the mouth of the user in any way.

Other objects and advantages will appear in the following specification, and the novel features of the invention will be particularly pointed out in the appended claims.

My invention is illustrated in the accompanying drawings, forming part of this application, in which—

Figure 1 is a side elevation of the brush with the handle removed,

Figure 2 is a plan view of the brush,

Figure 3 is a section along the line 3—3 of Figure 2, and

Figure 4 is a section along the line 4—4 of Figure 3.

In carrying out my invention, I provide a back 1 having bristles 2 disposed therein. The back 1 has an enlarged portion 3 and a recess 4 therein. A casing 5, preferably made of metal, is disposed within the recess 4. The casing 5 is provided with an arcuate-shaped socket 6 and side walls 7 extending transversely therefrom. The lower portion 8 of the casing 5 is provided with three depressions 9 therein.

A handle 10 is provided with a fastening clip 11. A portion 12 of the clip is embodied within the handle. The clip is fashioned so as to form a ball end 13. The free end of the clip is provided with a depression 14 and a push button 15. A groove 16 is cut into the handle sufficiently large to receive the free end of the clip.

From the foregoing description of the various parts of the device, the operation thereof may be readily understood. The clip 11 can readily be inserted into the casing 5, the ball end 13 of the clip being received in the arcuate-shaped socket 6, see Figure 2. When in this position, it will be observed that the adjacent end of the handle extends a slight distance within the casing, and is held in this position by means of the depression 14 being received in the central depending portion 9. To move the handle 10 in the position X shown in dotted lines in Figure 2, the button 15 is pressed inwardly until the depression 14 is freed from the central depending portion 9. Then by swinging the handle, the ball end 13 will move in the socket 6 until the depression 14 comes into alignment with the depending portion $9^x$. By releasing the button 15, the handle is rigidly held in the position X. If it is desirous to move the handle in the opposite direction, the button 15 is again moved inwardly a sufficient distance to allow the depression 14 to move freely over the lower portion 8 of the casing until the adjacent end of the handle strikes the wall 7. Then by releasing the button 15, the depression 14 will drop into the depending portion $9^y$. The handle is now in the position indicated at Y in dotted lines in Figure 2. The ball 13 of the clip is constantly in engagement with the socket 6, while the handle is attached to the back. The handle can readily be removed by pressing inwardly upon the button 15 until the depression 14 frees its adjacent depending portion. However, it is not necessary to remove the handle in order to change the position thereof.

The handle 10, when inserted in the back, as shown in full lines in Figure 2, is moved in a manner to cause the bristles to move parallel with the crevices in the teeth. This movement quickly dislodges the food particles from between the crevices and the movement may be so gentle as not to tear the gums. When cleansing the inner surfaces of the side rows of teeth, the handle is swung into either one of the two dotted line positions $x$ and $y$, depending upon whether the brush is being used to brush the bottom row of teeth, or the top row of teeth. The inclination of the handle permits the brush to be readily moved in a direction parallel with the crevices of the teeth, rather than across the teeth, as is necessary with a standard brush. When cleansing the inner surfaces of the teeth, the handle 10 is disposed in the full line position shown in Figure 2.

I claim:

1. A tooth brush construction comprising a back having a recess therein, a handle, and a spring clip carried by said handle and receivable in said recess for securing said handle to said back, said recess being flared outwardly for receiving the clip in various positions, whereby the handle may be swung into various positions.

2. A tooth brush construction comprising a back having a recess therein, a handle, a spring clip disposed in one end of said handle, said clip being receivable in said recess for securing said handle to said back, said recess being flared outwardly for receiving the clip and the adjacent end of said handle in various positions, and means cooperating with said clip for securing said handle in place, whereby the handle may be swung into various positions and be secured in place.

3. A tooth brush construction comprising a back having a recess therein, a handle, a spring clip disposed in one end of said handle, said clip having an arcuate-shaped end receivable in said recess, said recess being flared outwardly for receiving said clip and the adjacent end of said handle in various positions, and means cooperating with said clip for securing said handle in place, whereby the handle may be swung into various positions and be secured in place.

JAMES M. CALKINS.